(12) United States Patent
Rogers

(10) Patent No.: US 6,199,955 B1
(45) Date of Patent: Mar. 13, 2001

(54) SIDE DUMP BODY

(75) Inventor: Ralph R. Rogers, Dakota Dunes, SD (US)

(73) Assignee: Thurston Mfg. Co., Thurston, NE (US)

( * ) Notice: Subject to any disclaimer, the term of this patent is extended or adjusted under 35 U.S.C. 154(b) by 0 days.

(21) Appl. No.: 09/540,356

(22) Filed: Mar. 31, 2000

Related U.S. Application Data

(63) Continuation-in-part of application No. 09/349,669, filed on Jul. 8, 1999, which is a continuation of application No. 09/226,571, filed on Jan. 7, 1999, now Pat. No. 5,967,615.

(51) Int. Cl.[7] .................................................... B60D 1/16
(52) U.S. Cl. ........................... 298/18; 298/8 R; 298/22 P
(58) Field of Search ........................... 298/8 R, 18, 22 P; 414/470

(56) References Cited

U.S. PATENT DOCUMENTS

| 3,019,054 | 1/1962 | Stahly .................................... 298/18 |
| 3,323,838 | 6/1967 | Trucco et al. .......................... 298/8 R |
| 3,753,593 | 8/1973 | Wells et al. .......................... 298/18 X |
| 3,844,617 | 10/1974 | Kostman ............................. 298/18 X |
| 4,200,334 | 4/1980 | Lindholm ............................ 298/18 X |
| 5,480,214 | 1/1996 | Rogers ............................... 298/18 X |
| 5,967,615 | * 10/1999 | Rogers ................................... 298/18 |

* cited by examiner

Primary Examiner—Stephen Gordon
(74) Attorney, Agent, or Firm—Zarley, McKee, Thomte, Voorhees & Sease; Dennis L. Thomte

(57) ABSTRACT

A side dump body including a plurality of side dump body units pivotally mounted on a truck or trailer frame. Each of the side dump body units may be individually pivotally moved from a transport position to a dumping position whereby the contents of the dump body units may be dumped from the side of the truck or trailer.

2 Claims, 5 Drawing Sheets

SIDE DUMP BODY

CROSS-REFERENCE TO RELATED APPLICATION

This is a continuation-in-part application of applicant's earlier application Ser. No. 09/349,669 filed Jul. 8, 1999, entitled A SIDE DUMP BODY, which was a continuation application of application Ser. No. 09/226,571 filed Jan. 7, 1999, entitled A SIDE DUMP BODY, now U.S. Pat. No. 5,967,615.

BACKGROUND OF THE INVENTION

1. Field of the Invention

This invention relates to a side dump body and more particularly to a side dump body for use on a trailer or truck and which has increased carrying capacity when compared to conventional side dump trailers.

2. Description of the Related Art

Dump bodies which are employed on trailers or trucks normally are of the end dump type, bottom dump or the side dump type. Since the introduction of the side dump body disclosed in applicant's U.S. Pat. No. 5,480,214, side dump trucks and trailers have experienced wide acceptance. Perhaps the only drawback to applicant's earlier side dump body is that the body does not have as much carrying capacity as an end dump body due to the fact that the side walls of the side dump body extend upwardly and outwardly from a bottom wall, rather than extending vertically upwardly from a bottom wall as in most conventional end dump bodies. The bottom dump bodies also suffer the same drawback, since the side walls of those trailers normally extend upwardly and outwardly from a bottom wall rather than substantially vertically from a bottom wall.

A further disadvantage of conventional side dump and end dump trailers is that they are only able to haul a single commodity. Applicant's earlier applications, noted above, solve many of the shortcomings of the prior art. The instant invention represents an improvement over applicant's previous designs.

SUMMARY OF THE INVENTION

A side dump body is disclosed which has substantially vertically disposed side walls to increase the carrying capacity of the body as compared to those side dump bodies having upwardly and outwardly extending side walls. A side dump body comprises a wheeled frame means having a plurality of longitudinally spaced-apart dump bodies positioned thereon which are pivotally movable from a transport position to a dumping position. The dump bodies define a rearwardmost dump body, a forwardmost dump body, and at least one intermediate dump body positioned between the rearwardmost and forwardmost dump bodies. A first upstanding support is secured at its lower end to the first frame member of the wheeled frame means and extends upwardly therefrom rearwardly of the back wall of the rearwardmost dump body. The first support is pivotally secured to the back wall of the rearwardmost dump body adjacent one side wall thereof. A first hydraulic cylinder is operatively pivotally secured at its lower end to the frame means and extends upwardly therefrom rearwardly of the back wall and has its rods end pivotally secured to the back wall of the rearwardmost dump body. A second upstanding support is secured at its lower end to the first frame member of the wheeled frame means and extends therefrom forwardly of the front wall of the forwardmost dump body. The second support is pivotally secured to the front wall of the forwardmost dump body adjacent the first side wall thereof. A second hydraulic cylinder is operatively pivotally secured at its base end to the frame means and extends upwardly therefrom forwardly of the front wall of the forwardmost dump body and has its rod end pivotally connected to the front wall of the forwardmost dump body. A third upstanding support is secured at its lower end to the first frame member of the frame means and extends upwardly therefrom between the front wall of the rearwardmost dump body and the back wall of the intermediate dump body positioned forwardly thereof with the third support being pivotally secured to the front wall of the rearwardmost dump body and the back wall of the intermediate dump body positioned forwardly thereof. A third hydraulic cylinder is pivotally secured at its base end to the frame means and extends upwardly therefrom forwardly of the front wall of the rearwardmost dump body and has its rod end pivotally secured to the front wall of the rearwardmost dump body. A fourth hydraulic cylinder is pivotally secured at its base end to the frame means and extends upwardly therefrom rearwardly of the back wall of the intermediate dump body positioned forwardly of the rearwardmost dump body with the rod end of the fourth hydraulic cylinder being pivotally secured to the back wall of the intermediate dump body positioned forwardly of the rearwardmost dump body. A fourth upstanding support is secured at its lower end to the first frame member of the frame means and extends upwardly therefrom between the back wall of the forwardmost dump body and the front wall of the intermediate dump body positioned rearwardly thereof, and has its rod end pivotally secured to the back wall of the forwardmost dump body and the front wall of the intermediate dump body positioned rearwardly thereof. A fifth hydraulic cylinder is pivotally secured at its base end to the frame means and extends upwardly therefrom rearwardly of the back wall of the forwardmost dump body and has its rod end pivotally secured to the back wall of the forwardmost dump body. A sixth hydraulic cylinder has its base end pivotally secured at its lower end to the frame means and extends upwardly therefrom forwardly of the front wall of the intermediate dump body positioned rearwardly of the forwardmost dump body with the rod end of the sixth hydraulic cylinder being pivotally secured to the front wall of the intermediate dump body positioned rearwardly of the forwardmost dump body. The first and third cylinders are normally in a retracted position, but are movable to an extended position whereby the rearwardmost dump body will pivotally move with respect to the first and third supports and will pivotally move from its transport to its dumping position so that the material in the rearwardmost dump body will be dumped therefrom laterally of the frame means. The second and fifth cylinders are normally in their retracted condition, but are movable to an extended position whereby the forwardmost dump body will pivotally move with respect to the second and fourth supports to pivotally move from its transport position to its dumping position so that the material in the forwardmost dump body will be dumped therefrom laterally of the frame means. The fourth and sixth cylinders are normally in a retracted condition, but are movable to an extended position so that the intermediate dump body will pivotally move with respect to the third and fourth supports and will pivotally move from its transport position to its dumping position so that the material in the intermediate dump body will be dumped therefrom laterally of the frame means.

It is therefore a principal object of the invention to provide an improved side dump body for use on a truck or a trailer.

Still another object of the invention is to provide a side dump body having an increased carrying capacity when compared to conventional side dump bodies.

Yet another object of the invention is to provide a side dump body which is stable during use.

Still another object of the invention is to provide a side dump truck or trailer wherein a plurality of side dump bodies are individually selectively pivotally secured to the frame means of the truck or trailer.

Yet another object of the invention is to provide an improved mounting means which is positioned between adjacent side dump bodies.

These and other objects will be apparent to those skilled in the art.

DESCRIPTION OF THE PREFERRED EMBODIMENT

Figure 1:
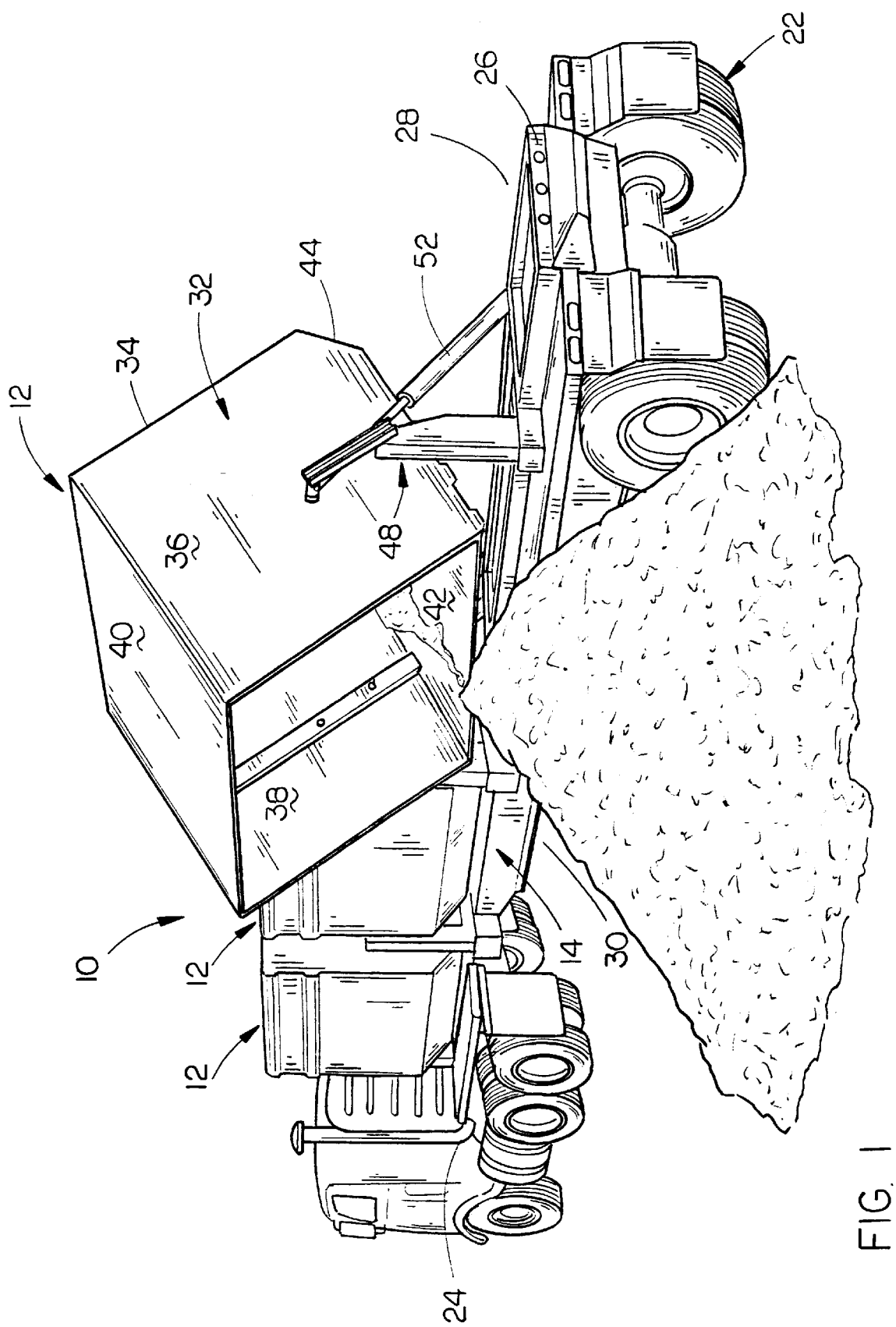
FIG. 1 is a rear perspective view of the side dump body of this invention with one of the dump bodies having been pivotally moved to a dumping position.

The side dump body of this invention is referred to generally by the reference numeral 10 and comprises one or more side dump units 12 mounted on a frame means 14 which may be incorporated into a trailer or into what is commonly called a straight truck. Although the drawings illustrate the side dump body 10 being mounted on a trailer the side dump body could also be mounted on a truck as described. In the drawings, the numeral 12 refers to the rearwardmost side dump unit while the designation 12A refers to the intermediate side dump unit and the designation 12B refers to the forwardmost side dump unit.

Frame means 14 normally comprises a pair of longitudinally extending frame members 18 and 20 which are conventionally supported on a running gear 22. For purposes of description, the frame means 14 will be described as including a forward end 24, rearward end 26, and opposite sides 28 and 30.

Inasmuch as each of the side dump units 12, 12A and 12B are identical, only a single side dump unit 12 will be described in detail. Side dump unit 12 includes a body or tub 32 including a bottom wall 34, rear wall 36, front wall 38, and side walls 40 and 42. A short tapered wall portion 44 is provided between bottom wall 34 and side wall 42, as seen in the drawings, for a purpose to be described hereinafter.

Figure 2:
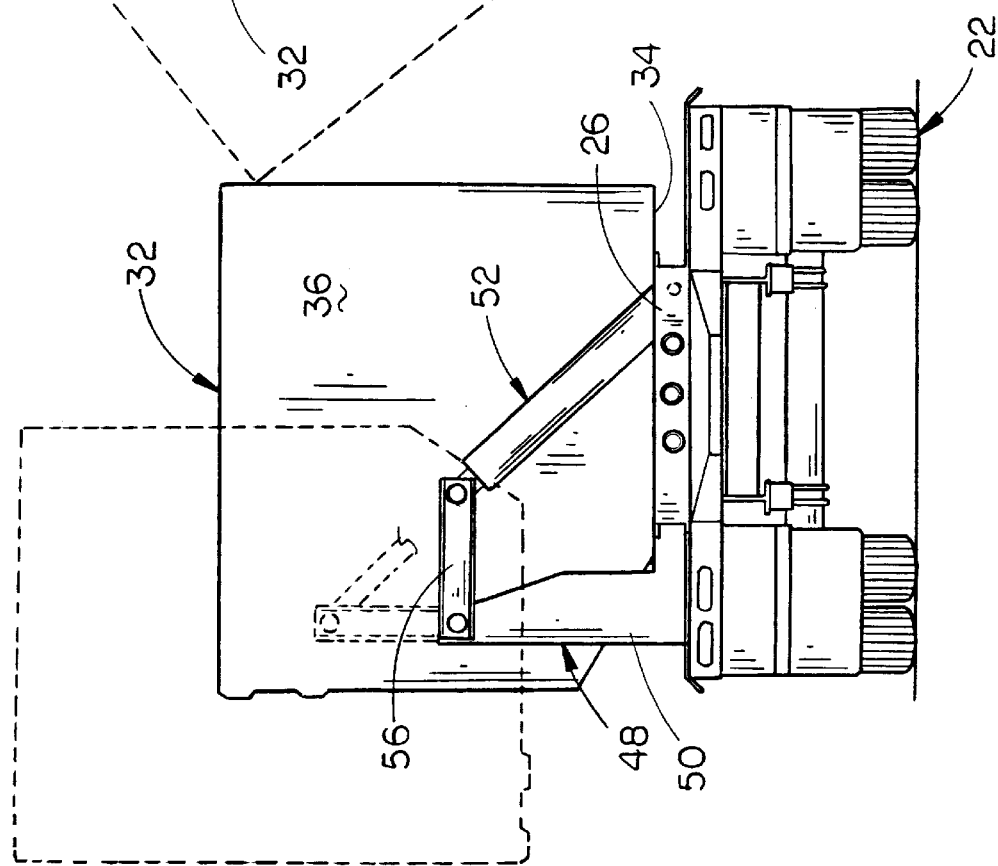
FIG. 2 is a rear elevational view of the side dump body of this invention with the broken lines illustrating the dump body being pivotally moved.
Figure 4:
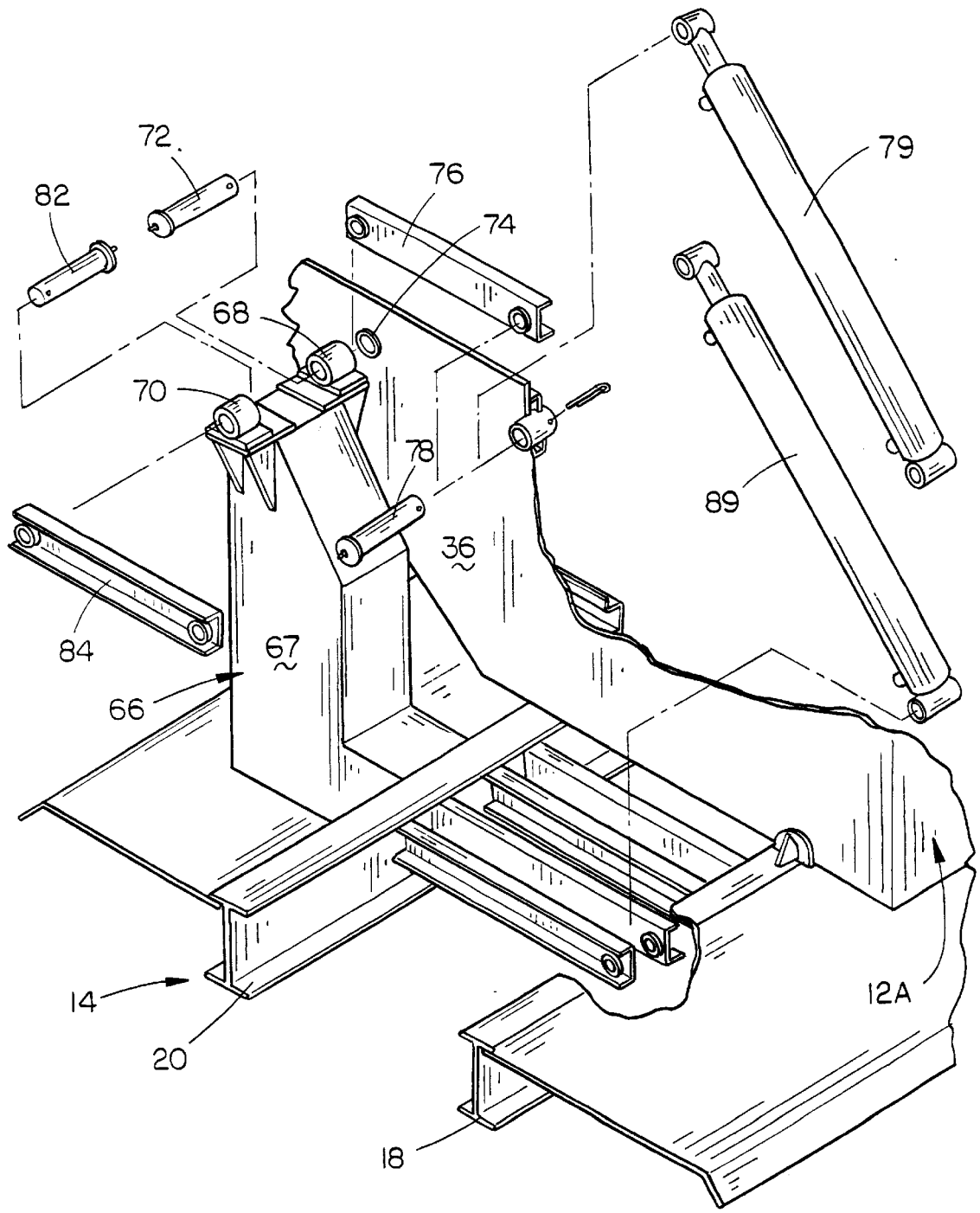
FIG. 4 is a partial exploded rear perspective view of one of the supports which are positioned between adjacent side dump bodies.
Figure 5:
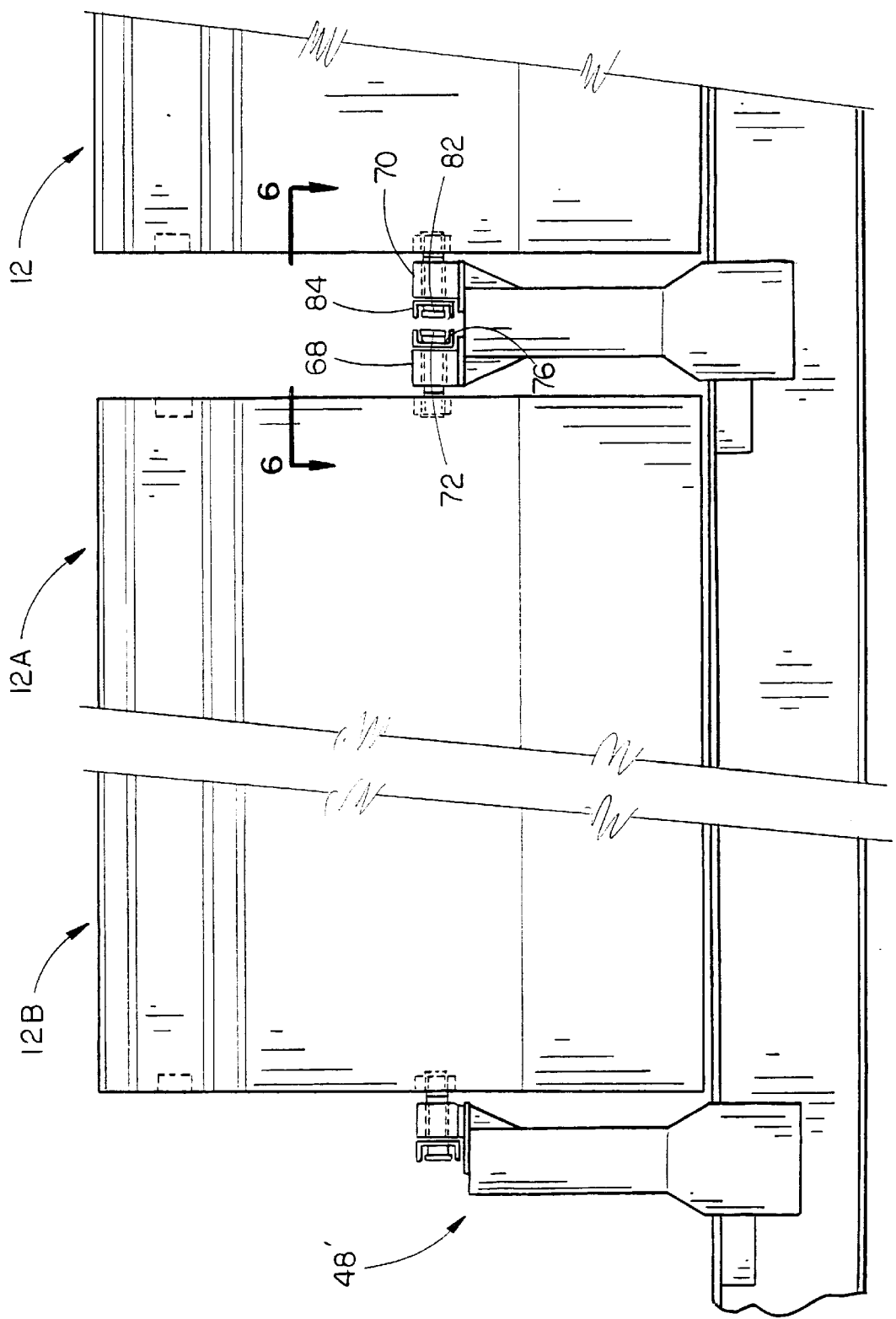
FIG. 5 is a partial side elevational view of the side dump body of this invention.
Figure 6:
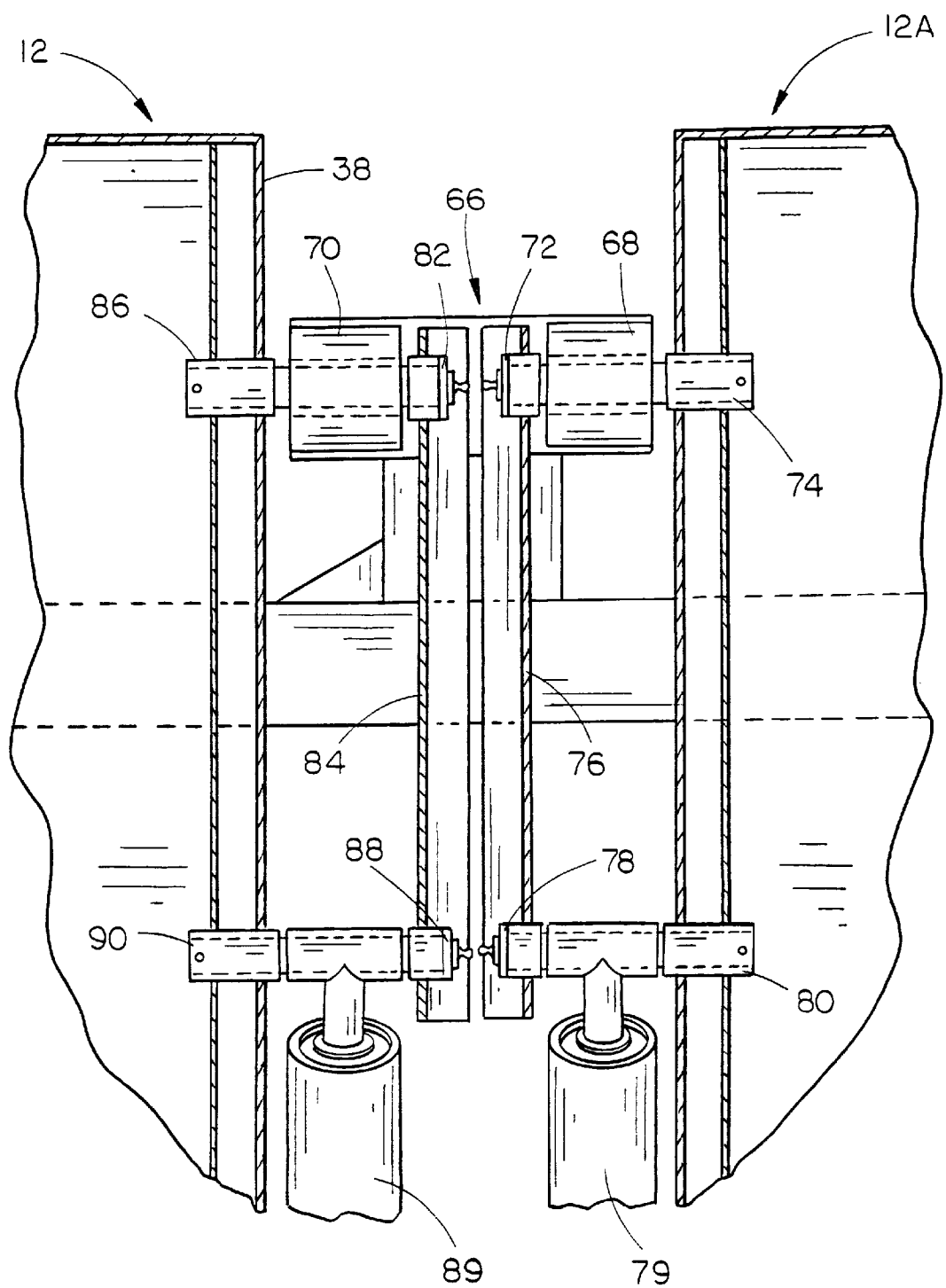
FIG. 6 is a sectional view as seen on lines 6—6 of FIG. 5.

A first support 48 is secured to the frame means 14 at the rearward end of the rearwardmost side dump unit 12. A second support 48', identical to support 48, is secured to the frame means 14 forwardly of the forward end of the forwardmost side dump unit 12B. Inasmuch as second support 48' is identical to first support 48, only first support 48 will be described in detail. As seen in FIG. 2, support 48 includes an upstanding post means or pedestal 50 which is welded to frame member 20 and which extends outwardly and upwardly therefrom. The base end of a hydraulic cylinder 52 is pivotally connected to cross members which are secured to and which extend between frame members 18 and 20. Hydraulic cylinder 52 has its rod end pivotally connected to a tubular member which is positioned in wall 36 of the rearwardmost side dump unit 12. A connecting arm 56 pivotally interconnects the tubular member and the upper end of post 50.

The second support 48' is identical to the first support 48, as stated, except that it is associated with the front wall 38 of the forwardmost side dump unit 12B rather than the back wall 36 of the side dump unit 12.

Supports 66 are positioned between the front walls and back walls of adjacent side dump units 12–12A and 12A–12B. Inasmuch as the supports 66 are identical, only the support 66 which is positioned between side dump units 12 and 12A will be described in detail. Post 67 of support 66 is secured to frame member 20 and extends outwardly and upwardly therefrom and has a pair of collars or sleeves 68 and 70 secured to the upper end thereof. Pin 72 is positioned in collar 68 and extends through collar 74 provided in rear wall 36 of side dump unit 12A positioned forwardly thereof. Pin 72 also extends through one end of a connecting arm 76 which is positioned between collar 68 and back wall 36 of side dump unit 12A. Pin 78 extends through the other end of connecting arm 76, through the rod end of hydraulic cylinder 79 and through the collar 80 which is mounted in the back wall 36 of side dump unit 12A.

Pin 82 extends rearwardly through the collar or sleeve 70, through the connecting arm 84 and extends through collar 86 provided in front wall 38 of the side dump unit 12 which is mounted immediately behind the support 66. A pin 88 extends through the other end of connecting arm 84, through the rod end of hydraulic cylinder 89 and through the collar 90 provided in wall 38.

The primary difference between the invention herein and that disclosed in applicant's earlier patent and patent application is that the single support 66 replaces a pair of supports which would normally be positioned between the front and back walls of adjacent side dump units. The utilization of a single support, as opposed to a pair of supports, reduces the weight of the overall unit and reduces the cost of manufacture.

Figure 3:
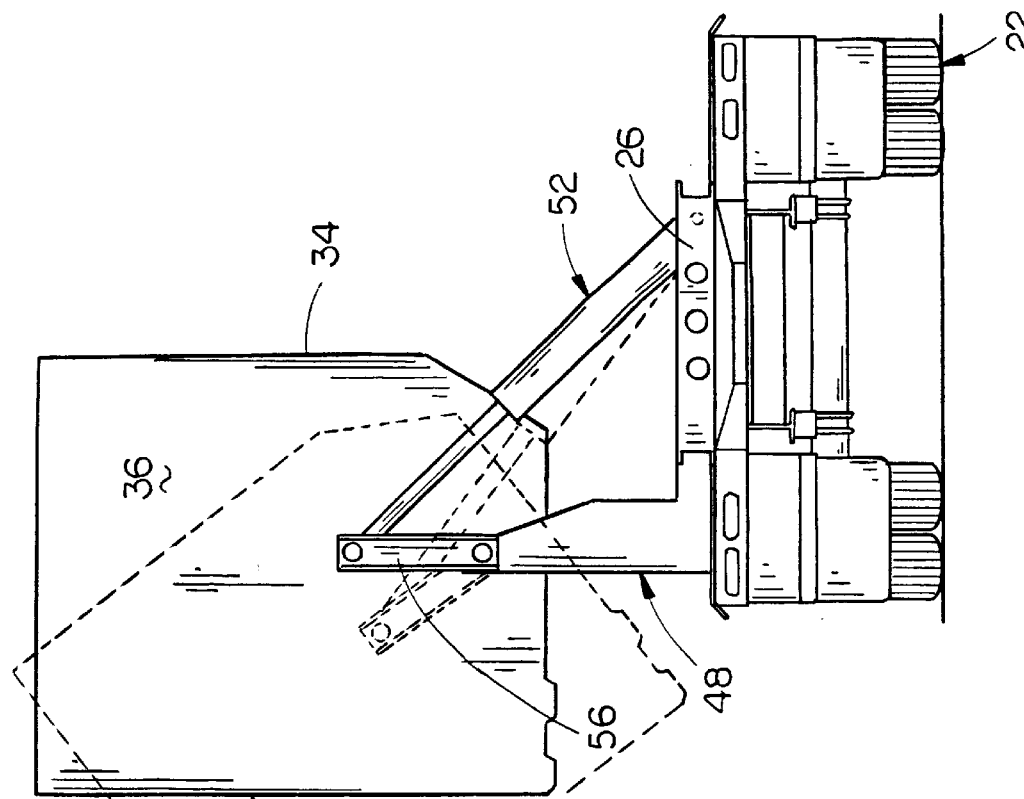
FIG. 3 is a view similar to FIG. 2 except that the dump body has been pivoted to its dumping position.

FIG. 2 illustrates the body 32 in its transport position. In the transport position, the bottom wall 34 of side dump unit 12 rests upon the frame members 18 and 20. When it is desired to dump the contents of the body 32 therefrom, the hydraulic cylinder 52 on support 48 and the hydraulic cylinder 89 on support 66 are simultaneously extended which causes the body 32 to be pivotally moved from the position illustrated by solid lines in FIG. 2 to the position illustrated by broken lines in FIG. 2. Further extension of the hydraulic cylinders causes the body to be pivotally moved to the position illustrated by broken lines in FIG. 3 so that the contents thereof will be dumped. The arrangement of the connecting arms 56 and 84, the posts 50 and 67, and the hydraulic cylinders 52 and 89, together with the relationship of the supports positioned at the ends of the side dump units, permits the body 32 to be dumped so that the contents are dumped therefrom laterally of the side of the truck or trailer. Angled wall portion 44 enables the body 32 to clear the frame member 20 as it is being pivotally moved from its transport position to its dumping position.

Thus, the side dump body of this invention enables different materials, such as mulch, peat, rock, gravel, etc., to be contained within the various side dump body units. Further, the concept of employing a multiple of side dump units creates stability to the invention, since the operator may dump only a single body unit while maintaining the other side dump body units in their non-dumping position. In other words, the side dump body invention will not tend to tip over as readily when only a single body unit is being dumped as opposed to if all of the side dump body units were dumped at the same time.

Further, the substantially vertically disposed side walls of the body increase the carrying capacity of the body as compared to the angled wall configuration of conventional side dump trailers.

Thus it can be seen that the invention accomplishes at least all of its stated objectives.

I claim:

1. In combination:

a wheeled frame means having a rearward end, a forward end, and first and second sides;

said frame means including first and second elongated, longitudinally extending frame members;

a plurality of longitudinally spaced-apart dump bodies positioned on said frame means and being pivotally movable from a transport position to a dumping position;

said dump bodies defining a rearwardmost dump body, a forwardmost dump body, and at least one intermediate dump body positioned between said rearwardmost and said forwardmost dump bodies;

each of said dump bodies including a front wall, a back wall, a bottom wall, and first and second side walls;

a first upstanding support, having upper and lower ends, secured at its lower end to said first frame member and extending upwardly therefrom rearwardly of the back wall of the said rearwardmost dump body;

said first support being pivotally secured to said back wall of said rearwardmost dump body adjacent the said first side wall thereof;

a second upstanding support, having upper and lower ends, secured at its lower end to said first frame member and extending upwardly therefrom forwardly of said front wall of the said forwardmost dump body;

said second support being pivotally secured to said front wall of said forwardmost dump body adjacent the said first side wall thereof;

a first hydraulic cylinder, having upper and lower ends, operatively pivotally secured at its lower end to said frame means and extending upwardly therefrom rearwardly of said back wall of said rearwardmost dump body;

said upper end of said first hydraulic cylinder being pivotally secured to said back wall of said rearwardmost dump body;

a second hydraulic cylinder, having upper and lower ends, operatively pivotally secured at its lower end to said frame means and extending upwardly therefrom forwardly of said front wall of said forwardmost dump body;

said upper end of said second hydraulic cylinder being pivotally secured to said front wall of said forwardmost dump body;

third upstanding support, having upper and lower ends, secured at its lower end to said first frame member and extending upwardly therefrom between said front wall of said rearwardmost dump body and said back wall of the intermediate dump body positioned forwardly thereof;

said third support being pivotally secured to said front wall of said rearwardmost dump body and said back wall of the intermediate dump body positioned forwardly thereof;

a third hydraulic cylinder, having upper and lower ends, operatively pivotally secured at its lower end to said frame means and extending upwardly therefrom forwardly of said front wall of said rearwardmost dump body;

said upper end of said third hydraulic cylinder being pivotally secured to said front wall of said rearwardmost dump body;

a fourth hydraulic cylinder, -having upper and lower ends, operatively pivotally secured at its lower end to said frame means and extending upwardly therefrom rearwardly of the said back wall of the said intermediate dump body positioned forwardly of said rearwardmost dump body;

said fourth hydraulic cylinder being pivotally secured to said back wall of the said intermediate dump body positioned forwardly of said rearwardmost dump body;

a fourth upstanding support, having upper and lower ends, secured at its lower end to said first frame member and extending upwardly therefrom between said back wall of said forwardmost dump body and the said front wall of the intermediate dump body positioned rearwardly thereof;

said fourth support being pivotally secured to said back wall of said forwardmost dump body and said front wall of the intermediate dump body positioned rearwardly thereof;

a fifth hydraulic cylinder, having upper and lower ends, operatively pivotally secured at its lower end to said frame means and extending upwardly therefrom rearwardly of said back wall of said forwardmost dump body;

said fifth hydraulic cylinder being pivotally secured to said back wall of said forwardmost dump body;

a sixth hydraulic cylinder, having upper and lower ends, operatively pivotally secured at its lower end to said frame means and extending upwardly therefrom forwardly of the said front wall of the said intermediate dump body positioned rearwardly of said forwardmost dump body;

said sixth hydraulic cylinder being pivotally secured to said front wall of the said intermediate dump body positioned rearwardly of said forwardmost dump body;

said first and third cylinders normally being in a retracted condition, but being movable to an extended position whereby said rearwardmost dump body will pivotally move with respect to said first and third supports and will pivotally move from its transport position to its dumping position so that material in said rearwardmost dump body will be dumped therefrom laterally of said frame means;

said second and fifth cylinders normally being in a retracted condition, but being movable to an extended position whereby said forwardmost dump body will pivotally move with respect to said second and fourth supports and will pivotally move from its transport position to its dumping position so that material in said forwardmost dump body will be dumped therefrom laterally of said frame means;

said fourth and sixth cylinders normally being in a retracted condition, but being movable to an extended position whereby said intermediate dump body will pivotally move with respect to said third and fourth supports and will pivotally move from its transport position to its dumping position so that material in said intermediate dump body will be dumped therefrom laterally of said frame means.

2. In combination:

a wheeled frame means having a rearward end, a forward end, and first and second sides;

said frame means including first and second elongated, longitudinally extending frame members;

front and rear, longitudinally spaced-apart dump bodies positioned on said frame means and being pivotally movable from a transport position to a dumping position;

each of said dump bodies including a front wall, a back wall, a bottom wall, and first and second side walls;

a first upstanding support, having upper and lower ends, secured at its lower end to said first frame member and extending upwardly therefrom rearwardly of the back wall of said rear dump body;

said first support being pivotally secured to said back wall of said rear dump body adjacent the said first side wall thereof;

a second upstanding support, having upper and lower ends, secured at its lower end to said first frame member and extending upwardly therefrom forwardly of said front wall of said first dump body;

said second support being pivotally secured to said front wall of said front dump body adjacent the said first side wall thereof;

a third upstanding support, having upper and lower ends, secured at its lower end to said first frame member and extending upwardly therefrom between said back wall of said front dump body and said front wall of said rear dump body;

said third support being pivotally secured to said back wall of said front dump body and to said front wall of said rear dump body;

a first hydraulic cylinder, having upper and lower ends, operatively pivotally secured at its lower end to said frame means and extending upwardly therefrom rearwardly of said back wall of said rear dump body;

said upper end of said first hydraulic cylinder being pivotally secured to said back wall of said rear dump body;

a second hydraulic cylinder, having upper and lower ends, operatively pivotally secured at its lower end to said frame means and extending upwardly therefrom forwardly of said frontwall of said front dump body;

said upper end of said second hydraulic cylinder being pivotally secured to said front wall of said front dump body;

a third hydraulic cylinder, having upper and lower ends, operatively pivotally secured at its lower end to said frame means and extending upwardly therefrom forwardly of said front wall of said rear dump body;

said upper end of said third hydraulic cylinder being pivotally secured to said front wall of said rear dump body;

a fourth hydraulic cylinder, having upper and lower ends, operatively pivotally secured at its lower end to said frame means and extending upwardly therefrom rearwardly of said back wall of said front dump body;

said upper end of said fourth hydraulic cylinder being pivotally secured to said back wall of said front dump body;

said first and third cylinders normally being in a retracted condition, but being movable to an extended position whereby the said rear dump body will pivotally move with respect to said first and third supports and will pivotally move from its transport position to its dumping position so that material in said rear dump body will be dumped therefrom laterally of said frame means;

said second and fourth cylinders normally being in a retracted condition, but being movable to an extended position whereby the said front dump body will pivotally move with respect to said second and fourth supports and will pivotally move from its transport position to its dumping position so that material in said front dump body will be dumped therefrom laterally of said frame means.

* * * * *